Dec. 31, 1968  J. WOTTON  3,419,233
AIRCRAFT FUEL SUPPLY ARRANGEMENTS
Filed Jan. 30, 1967  Sheet 2 of 3

United States Patent Office 3,419,233
Patented Dec. 31, 1968

3,419,233
AIRCRAFT FUEL SUPPLY ARRANGEMENTS
John Wotton, Weybridge, England, assignor to British Aircraft Corporation (Operating) Limited, London, England, a British company
Filed Jan. 30, 1967, Ser. No. 612,586
Claims priority, application Great Britain, Jan. 31, 1966, 4,247/66
8 Claims. (Cl. 244—135)

ABSTRACT OF THE DISCLOSURE

An aircraft fuel supply arrangement in an aircraft having at least one propulsion engine in which the fuel is forced outwardly and rearwardly in the wing tanks so that the center of gravity is moved aft as the fuel is consumed from the wing tanks. Thereafter the fuel in a rear tank is consumed when the center of gravity has moved sufficiently far aft to counterbalance the aftward movement of the fuel in the wing tanks to thereby maintain the center of gravity in the optimum position.

---

Figure 1:
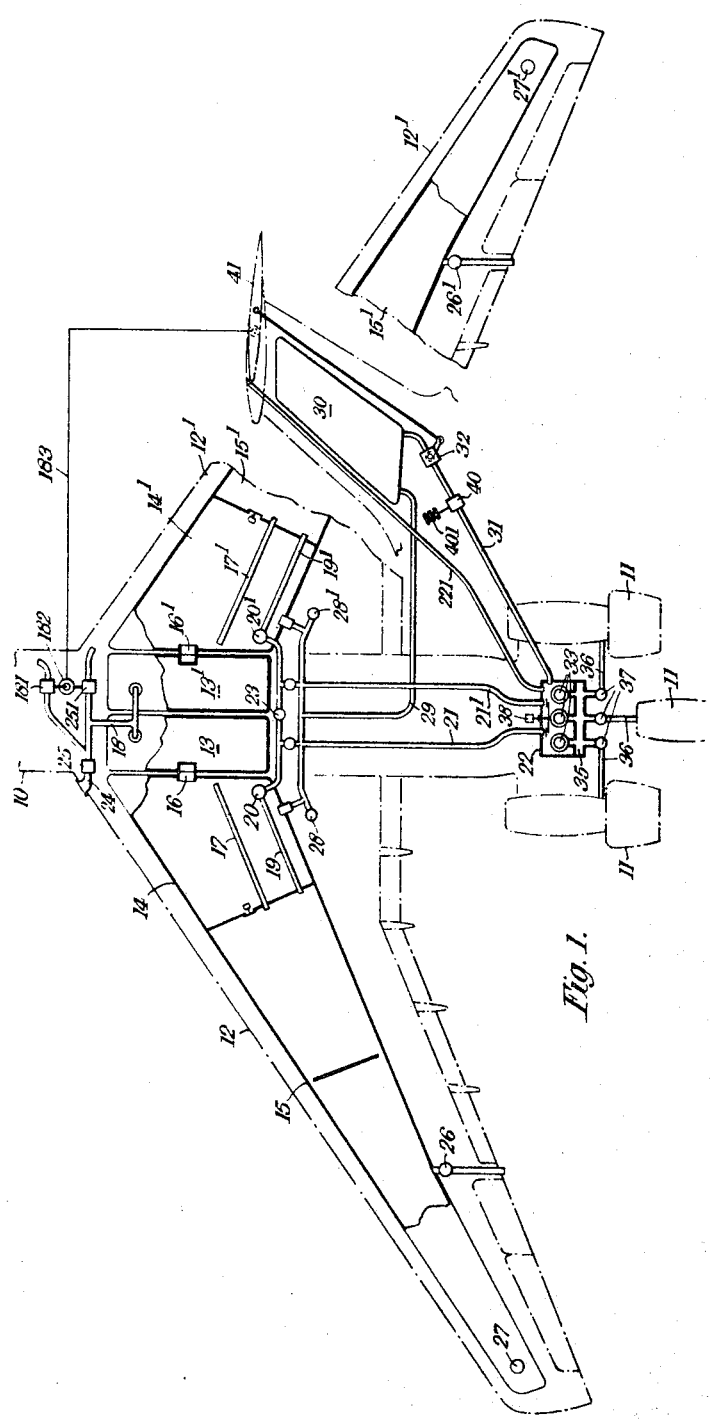

This invention relates to aircraft fuel supply arrangements. It is particularly applicable to aircraft having wings which are swept back or of delta form in plan. An object of the invention is to effect desirable changes in the trim of the aircraft as the fuel is consumed by the engine or engines in flight, using relatively simple means requiring a minimum of attention from the crew of the aircraft.

It will be realized that an aircraft in flight is finely balanced about its centre of gravity (C.G.). To cover varying loads and disposition of these loads, an aircraft, and particularly any large passenger aircraft, must inherently be able to accommodate a range of longitudinal positions of its centre of gravity, though there will be an optimum C.G. position for any given flight condition and any departure from this position will necessitate adjustments of the control surfaces which involve extra drag (known as trim drag) which increases as the C.G. is moved further from the optimum position. If the centre of gravity can be maintained at or near its optimum position throughout the major part of a flight, trim drag will be minimised with a consequent beneficial effect on operating costs. This applies to aircraft with all engine configurations, but the problem is aggravated in a rear-engined aircraft by reason of the forward location of the pay-load, which means that in the fully loaded condition of the aircraft the C.G. will be at the extreme forward end of its permissible longitudinal range of positions.

In all aircraft, and particularly in rear-engined types, it is therefore of particular advantage to employ fuel management as a means of optimising the position of the centre of gravity during flight to obtain minimum trim drag. This has been done previously by a tank selection fuel drill to be followed by the crew of the aircraft both during flight as fuel is consumed and during refuelling operations. It involves a fuel system incorporating numerous pumps and selector valves.

According to the present invention, in an aircraft having at least two fuel tanks disposed in longitudinally staggered relationship in each wing so that the outboard tanks are further aft than the inboard tanks, means for supplying fuel to the propulsion engine or engines are arranged to draw fuel from the aftmost, i.e. outboard, tank in each wing simultaneously, and further means are provided for transferring fuel from the inboard tanks to the outboard tanks as the fuel is supplied from the latter to the engine or engines so that the centre of gravity of the aircraft tends to move aft as the fuel from the wing tanks is consumed. This aft movement of the centre of gravity may bring it to the optimum position during flight, or (e.g. if the aircraft is lightly loaded) the centre of gravity may already be in the optimum position at take-off. In such circumstances aft movement of the centre of gravity is no longer required. The aircraft is therefore preferably provided with at least one further fuel tank at its rear end, e.g. in the fin, and with means actuated in response to changes in the position of the aircraft's centre of gravity and arranged to cause fuel to be fed from that tank to the engine or engines when the centre of gravity reaches a given longitudinal position, at a rate which will arrest aft movement of the centre of gravity by counterbalancing the aft movement of the fuel in the wing tanks.

In the wings, the means for transferring fuel to the outboard tanks may comprise a tank pressurisation system which forces the fuel in the required direction. The wing tank pressurisation system may also be controlled in dependence upon the position of the centre of gravity and alternative fuel supply means may be arranged to draw fuel from the inboard tanks when the pressurisation is cut off.

Control of the position of the aircraft's centre of gravity by means of its fuel during normal cruising conditions is effected simply by feeding the fuel from the rear tank into the engine supply line at a suitable rate, when the centre of gravity has reached the optimum position. In an aircraft having such a rear tank in the fin and also a variable incidence tailplane, in which, in cruising conditions, the tailplane setting is an indication of the position of the aircraft's centre of gravity, the metering of the fin tank fuel to the engines can be controlled by a metering valve which commences to open when the tailplane incidence is increased above a given value.

With such an aircraft, the tailplane incidence during the climb, particularly the high speed climb, may in some circumstances differ from that which would be used in cruising conditions with the same C.G. position. An altitude sensitive control valve may therefore be included in the fuel supply duct from the fin tank to prevent supply from the fin tank, e.g. under high speed climb conditions, until a prescribed altitude has been reached.

Figure 2:
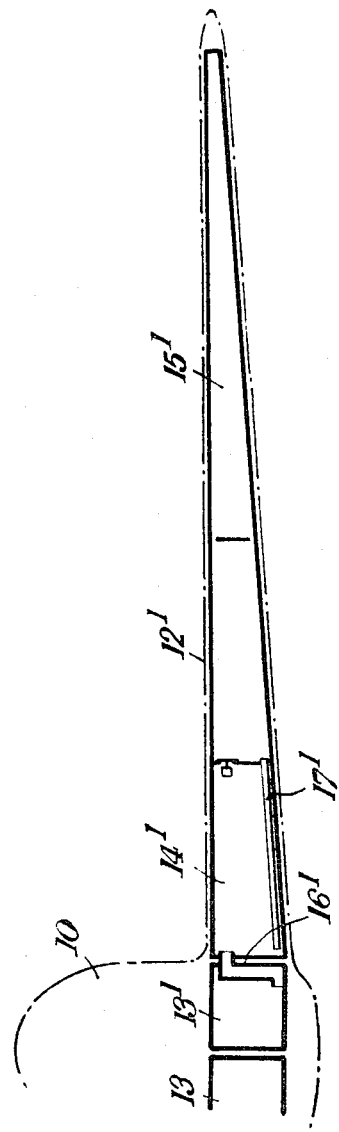
Figure 3:
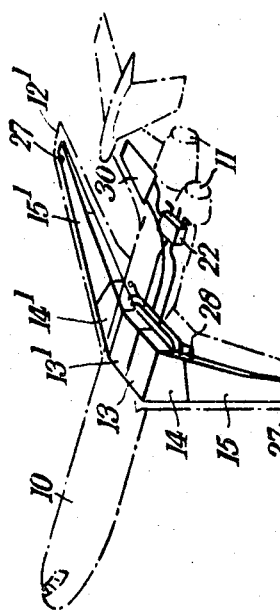

An arrangement in accordance with the invention, embodied in a transport aircraft having three rear-mounted engines and a variable-incidence tailplane, will now be described by way of example and with reference to the accompanying drawings, in which:

FIGURE 1 is a diagram of the fuel system superimposed on the plan form of an aircraft, FIGURE 2 is a span-wise section of a wing showing fuel tanks and ducts, FIGURE 3 is a three-quarter rear view of the aircraft with the fuel system superimposed, and FIGURES 4 to 7 illustrate diagrammatically the operation of the arrangement in various conditions.

The aircraft consists of a fuselage 10, at the rear of which are mounted three gas-turbine engines 11, shown for example as aft fan engines. Swept wings 12, 12' contain a series of integral fuel tanks of which tanks 13, 13' are within the wing centre section, tanks 14, 14' are in the wing root and tanks 15, 15' are in the outboard wing panels. The bottoms of tanks 13, 13' are connected to the tops of tanks 14, 14' respectively by weirs 16, 16'. The bottoms of tanks 14, 14' are connected to the bottoms of tanks 15, 15' by transfer ducts 17, 17' respectively. The tanks are pressurised at a low level, say 3 pounds per square inch gauge, by air pressure obtained locally from the cabin air conditioning system (or by pressure of an inert gas) through valve 181 and pipe 18 which exhausts into tanks 13, 13'. Fuel is collected from tanks 15, 15' by ducts 19, 19' and transferred aft via line booster pumps 20, 20' and separate fuel lines 21, 21' in the fuselage to a collector tank 22 which will be described later. A cross feed with suitable valves is provided for emergency use and is shown at reference 23. The fuel tanks have a known vent system incorporating a "straight through" inward-outward vent pipe 24 which communicates with the pressurisation pipe 18 and which incorporates a pressure-maintaining, or inward-venting valve 25, and a pressure-regulating, or outward venting valve 251. The system is arranged so that at cruising speed the tanks may be pressurised by ram air effect via pipe 24 while in other conditions the pressurisation is maintained by the supply via valve 181. Valves 181 and 251 are controlled by a servo-motor 182 as described below.

A jettison valve and outlet 26, 26' is connected to each outboard tank 15, 15'. An advantage of the pressurised tank system is that fuel is jettisoned under pressure and flow is limited only by valve and outlet sizes. Each outboard tank has an overwing filling point 27, 27' at its highest point (due to wing dihedral) for gravity refuelling. A pressure refuelling or defuelling point 28, 28' on each wing respectively connects via duct 29 to tanks 14, 14' respectively.

A tank 30 in the aircraft fin is also connected to duct 29. This tank also connects to the collector tank 22 by means of line 31 and a metering valve 32. The method of actuating this valve will be described later. Being high up, the fin tank does not require pressurisation but can discharge under gravity.

In certain circumstances to be described, the wing tanks are unpressurised by opening valve 251 and closing valve 181 and in this case, because of wing dihedral, fuel travels inwards from the outboard tanks 15, 15' through the transfer ducts 17, 17' to tanks 14, 14' where line booster pumps 20, 20' transfer the fuel aft to the collector tank 22. Intakes for these pumps are provided in the lowest portions of the tanks 14, 14' and operate only when fuel is flowing inwards under gravity.

The arrangement of weirs 16, 16' connecting tanks 13, 13' and 14, 14' respectively provides that the wing centre section tanks 13, 13' which are effectively in the lower part of the fuselage are emptied first as fuel is consumed, and when tank pressurisation is shut down fuel flows inboard only as far as tanks 14, 14'.

The collector tank 22 in this particular embodiment is formed by a single tank to which fuel lines 21, 21' from the wing tanks and line 31 from the fin tank 30 are connected. The tank 22 contains three submerged booster pumps 33, driven by electric motors supplied with power from each of the three separate electrical circuits in the aircraft. The pumps discharge into a common manifold 35 from which three supply lines 36 connect to respective engines 11 via pressure maintaining devices 37. Collector tank 22 has a vent pipe 221 leading to the top of the fin.

Fuel flow from the port and starboard wing tanks into the collector tank 22 is equalized by a known type of proportioning system indicated at 38, consisting basically of orifices associated with supply lines 21, 21' which are successively blanked and uncovered as required.

The discharge from fuel line 31 from the fin tank 30 is controlled by a float valve (not shown) in the tank 22 and an on-off valve 40 controlled by an altitude sensitive device 401, in addition to the metering valve 32 already mentioned. The altitude sensitive device 401 can be over-ridden manually, if necessary.

The metering valve 32 is controlled through an electrical or (as shown in FIGURES 4 to 7) a mechanical connection 39 from the aircraft's variable-incidence tailplane 41, so as to be opened when the tailplane incidence exceeds a first predetermined value. The servo-motor 182 is energized by an electrical signal from the tailplane 41 via line 183 when the incidence exceeds a second, slightly higher, value, so as to open valve 251 and close valve 181 and thereby release the wing tank pressurisation.

FIGURES 4 to 7 illustrate how the fuel flow can be controlled and consequently how the aircraft can be trimmed to obtain the optimum position of its centre of gravity (C.G.). Two functions are required for this:
 (1) Fin fuel metering to engine supply line.
 (2) Supply and release of wing tank pressurisation.

The fin tank 30 is normally filled prior to fight irrespective of fuel load in the wing tanks. It will be understood that the aircraft's variable incidence tailplane 41 is moved as a whole in dependence on the position of the centre of gravity.

Figure 4:
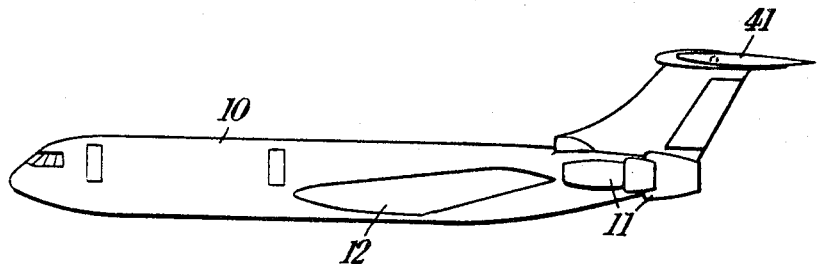

FIGURE 4 illustrates the aircraft in the cruise condition. In this case operation is as follows:

The altitude sensitive device 401 causes valve 40 to be open. Assuming a forward C.G. position, the low or negative tailplane incidence causes metering valve 32 to be closed and wing tank pressurisation on via valve 181. Thus fuel is retained in the fin tank 30 and fuel is used from the outboard tanks 15, 15' in the wings, the unused fuel being forced progressively from the inboard to the outboard tanks. The aircrafts C.G. position thus moves progressively aft.

When the C.G. reaches its optimum position at the aft end of its permissible range, the tailplane incidence will have been increased sufficiently to cause the metering valve 32 to open and as the valve 40 remains open the fin fuel is fed to the engines at a rate sufficient to counter-balance the aft C.G. movement caused by usage of wing fuel. The metering valve 32 opens over a small range of tailplane incidence values and the rate of feed of fin fuel is self-adjusting to counterbalance the aft C.G. movement. The aft C.G. position is retained as long as fin fuel remains. The rate of fin fuel usage will be low because of the fin tank distance from the C.G. point (a long moment arm) and the C.G. will be held steady in its furthest aft position (the optimum for cruise) for most of the cruise period.

Figure 5:
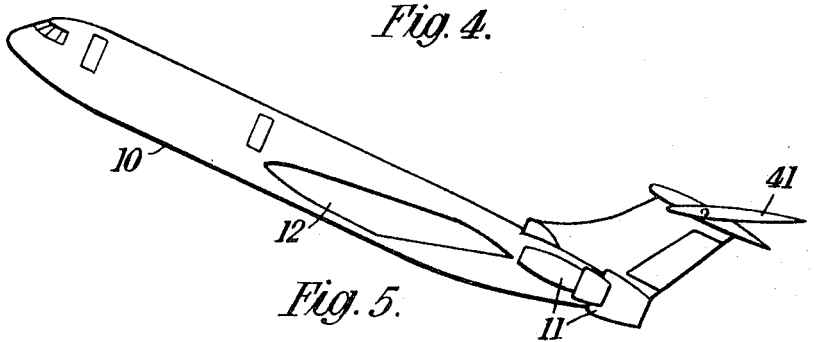

FIGURE 5 illustrates the aircraft in the "climb out" condition after take-off.

The tailplane 41 will normally have negative incidence during this period. The metering valve 32 is closed as is the altitude sensitive valve 40. No fuel is taken from the fin. Wing tank pressurisation is on and fuel is accordingly used from the outboard tanks 15, 15' causing the C.G. to move progressively aft as the inboard tanks 13, 13', 14, 14' are emptied. If the C.G. reaches a postion near the aft limit, the increasing tailplane incidence causes metering valve 32 to open but fuel feed from the fin tank 30 is prevented by the altitude sensitive switch 40. If the aft C.G. limit should be reached the increasing tailplane incidence will be such as to cause valve 251 to be opened and valve 181 closed and thus to cause pressurisation in the wing tanks to be removed to stop aft C.G. movement due to wing fuel shift.

Figure 6:
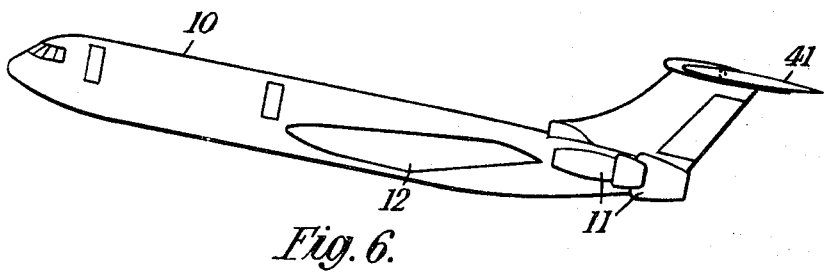

FIGURE 6 illustrates the high speed climb condition.

This control sequence is as for FIGURE 5, but it is in this condition that tailplane incidence is likely to differ most from the incidence used in the cruise condition with the same C.G. position. Altitude sensitive valve 40 is therefore required to be kept closed. As in FIGURE 5, certain conditions may bring the C.G. to its aft limit, whereupon additional tailplane incidence beyond a prescribed value releases the wing tank pressurisation. The specific aircraft condition is low loading aft C.G. with partial wing fuel at take-off but with fuel carried in the fin. The altitude sensitive switch 40 can be manually over-ridden by the pilot if he wishes.

Figure 7:
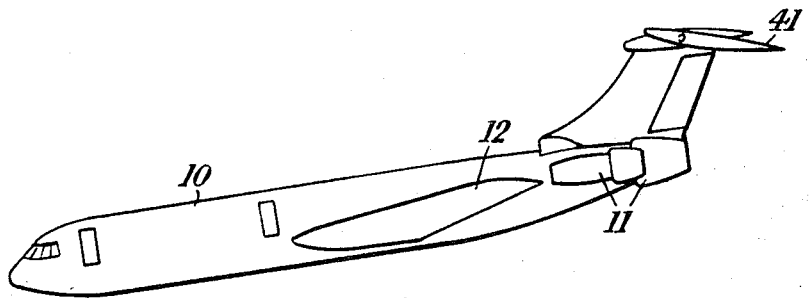

FIGURE 7 illustrates the descent condition. With an aft C.G. position, a positive tailplane incidence will cause metering valve 32 to open and in some circumstances depending on altitude will also cause the wing tank pressurisation to be off. With a forward C.G. position the reduced tailplane incidence will continue to cause wing tank pressurisation, and metering valve 32 will be closed. In operation, however, it is anticipated that the fin tank will be drained into the outboard wing tanks by manual selection preparatory to landing. Under normal circumstances it is anticipated that the aircraft will be landed with wing fuel outboard and the fin tank empty.

The system will preferably be unpressurised at take-off in response to a signal from the undercarriage in the extended condition, and will remain so until the aircraft is airborne with undercarriage retracted, to ensure a forward C.G. position during the take-off run, which is desirable for obtaining effective steering by the nose-wheel (not shown).

What I claim as my invention and desire to secure by Letters Patent is:

1. An aircraft fuel supply arrangement in an aircraft having at least one propulsion engine comprising at least two fuel tanks disposed in longitudinally staggered relationship in each wing so that the outboard tanks are further aft than the inboard tanks, at least one further fuel tank disposed at the rear end of the aircraft and aft of the aftermost wing tanks, means for supplying fuel to said propulsion engine, said fuel supply means including means for drawing fuel from the aftermost outboard tank in each wing simultaneously, means for transferring fuel from the inboard wing tanks to the outboard wing tanks as fuel is drawn from the latter whereby the center of gravity of the aircraft is progressively moved afterwards, and said fuel supply means further including means for drawing fuel from said further fuel tank at the rear end of the aircraft to arrest said afterwards movement of the center of gravity at a predetermined position by counterbalancing the aft movement of the fuel in the wing tanks.

2. An aircraft fuel supply arrangement as claimed in claim 1 further comprising a control member operable in proportion to the magnitude of a shift of the longitudinal position of the center of gravity wherein said means for drawing fuel from said further fuel tank are adapted to be controlled by said control member when the center of gravity reaches a predetermined longitudinal position.

3. An aircraft fuel supply arrangement as claimed in claim 2 wherein said control member comprises a variable incidence tailplane of the aircraft.

4. An aircraft fuel supply arrangement as claimed in claim 3 wherein the means for drawing fuel from said further fuel tank comprise a metering valve actuated in response to the tailplane incidence setting and disposed in a fuel supply duct between the said further fuel tank and the engine.

5. An aircraft fuel supply arrangement according to claim 4, wherein the fuel supply duct incorporates an altitude sensitive control valve to cut off the fuel supply from the rear tank at lower altitudes.

6. An aircraft fuel supply arrangement according to claim 2, wherein the means for transferring fuel from the inboard wing tanks to the outboard wing tanks is controlled in dependence upon the position of said control member.

7. An aircraft fuel supply arrangement according to claim 6, wherein the means for supplying fuel to the propulsion engine or engines include pumps having intakes adapted to withdraw fuel alternatively from the outboard tanks when the fuel transferring means are in operation and from the inboard tanks when the fuel transferring means are inoperative.

8. An aircraft fuel supply arrangement according to claim 1, wherein the fuel tanks in each wing comprise a first inboard tank in the wing center section, connected by a weir to a second intermediate inboard tank in the wing root, whose bottom is connected by a transfer duct to the bottom of a third, outboard tank, and the fuel transferring means including means for applying pneumatic pressure to said first inboard tanks.

References Cited

UNITED STATES PATENTS

| 2,684,217 | 7/1954 | Edwards | 244—135 |
| 2,703,607 | 3/1955 | Simmonds | 244—135 X |
| 2,853,259 | 9/1958 | Underwood | 244—135 |
| 3,017,141 | 1/1962 | Ollodort | 244—135 |
| 3,275,061 | 9/1966 | Williams et al. | 244—135 |

MILTON BUCHLER, *Primary Examiner.*

J. PITTENGER, *Assistant Examiner.*